US006829226B1

United States Patent
Apostolides et al.

(10) Patent No.: US 6,829,226 B1
(45) Date of Patent: *Dec. 7, 2004

(54) POWER CONTROL FOR A MOBILE TERMINAL IN A SATELLITE COMMUNICATION SYSTEM

(75) Inventors: Maria Apostolides, Durham, NC (US); Paul Wilkinson Dent, Pittsboro, NC (US)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/832,826

(22) Filed: Apr. 4, 1997

(51) Int. Cl.[7] ......................... H04B 7/185; H04B 7/212
(52) U.S. Cl. ................... 370/318; 370/321; 455/522
(58) Field of Search ............................. 370/317, 310, 370/311, 314, 316, 318, 321, 325, 332, 347, 252, 330, 337, 516, 528; 455/10, 12.1, 522, 13.4, 67.1, 69, 127

(56) References Cited

U.S. PATENT DOCUMENTS

| | | | |
|---|---|---|---|
| 3,925,782 A | | 12/1975 | Andrel et al. |
| 4,868,795 A | * | 9/1989 | McDavid et al. .............. 455/69 |
| 4,941,199 A | * | 7/1990 | Saam .......................... 455/10 |
| 5,056,109 A | | 10/1991 | Gilhousen et al. |
| 5,220,678 A | | 6/1993 | Feei |
| 5,241,583 A | * | 8/1993 | Martensson .................. 455/565 |
| 5,267,262 A | | 11/1993 | Wheatley, III |
| 5,278,992 A | * | 1/1994 | Su et al. ...................... 455/522 |
| 5,299,199 A | * | 3/1994 | Wilson et al. ............... 370/351 |
| 5,305,468 A | | 4/1994 | Bruckert et al. |
| 5,333,175 A | | 7/1994 | Ariyavisitakul et al. |
| 5,345,598 A | * | 9/1994 | Dent ........................... 455/522 |
| 5,357,513 A | * | 10/1994 | Kay et al. .................... 370/318 |
| 5,452,473 A | | 9/1995 | Weiland et al. |
| 5,559,807 A | * | 9/1996 | Van Den Heuvel et al. 370/347 |
| 5,559,838 A | * | 9/1996 | Nakagoshi ................... 370/347 |
| 5,604,730 A | * | 2/1997 | Tiedemann, Jr. ............. 370/252 |
| 5,631,921 A | * | 5/1997 | Schilling ..................... 455/522 |
| 5,663,957 A | * | 9/1997 | Dent ........................... 370/347 |
| 5,668,556 A | * | 9/1997 | Rouffet et al. ............... 342/354 |
| 5,740,165 A | * | 4/1998 | Vannucci ..................... 370/330 |
| 5,828,335 A | * | 10/1998 | Al-Dhahir et al. .......... 455/13.4 |
| 5,914,947 A | * | 6/1999 | Saito ........................... 370/337 |
| 6,070,086 A | * | 5/2000 | Dobrica ....................... 455/522 |

FOREIGN PATENT DOCUMENTS

| | | |
|---|---|---|
| EP | 0 610 030 A2 | 8/1994 |
| EP | 0717508 A2 | 6/1996 |
| EP | 0717508 A3 | 7/1996 |

* cited by examiner

*Primary Examiner*—Andy Lee
(74) *Attorney, Agent, or Firm*—Coats & Bennett, P.L.L.C.

(57) ABSTRACT

A method for controlling the transmit power level of a mobile terminal in a satellite communication system includes both a closed-loop element and an open-loop element. For the closed-loop element, the base station calculates the mobile terminal's power setting based on the strength of the signals received from the mobile terminal. The base station takes into account the propagation delays of the satellite system in determining the mobile terminal's transmit power setting. The open-loop element of the power control method allows the mobile terminal to adjust its own transmit power level from frame to frame based on the strength of the received signals from the base station. The strength of the signal received from the base station in each frame is compared to the strength of the signal received in the previous frame. The transmit power level of the mobile terminal is then adjusted inversely in accordance with variations in the observed signal strength.

22 Claims, 9 Drawing Sheets

POWER CONTROL FOR A MOBILE TERMINAL IN A SATELLITE COMMUNICATION SYSTEM

FIELD OF THE INVENTION

The present invention relates generally to the field of mobile satellite communication systems, and more particularly, to a power control method for controlling the transmit power of a mobile terminal in a satellite communication system.

BACKGROUND OF THE INVENTION

Satellite systems are playing an increasing role in mobile communications by providing coverage in zones where land-based infrastructures are unable or ineffective to supply mobile services. Satellite systems can, for example, provide coverage in large, sparsely-populated areas where it is not cost effective to implement network infrastructures. Satellite systems can also make services available to airborne and sea-based users. Another use of satellite systems is to back-up or supplement a land-based network. Satellite systems can continue to provide services to users when segments of the network infrastructure are down, can carry additional traffic during peak transmission periods when the land-based network is overloaded, and can fill-in holes in the coverage area of a land-based system caused by man-made or natural obstacles.

Satellite communication systems are typically a derivative of GSM, which is adapted for use in a satellites system. The GSM technical specifications are published by the European Telecommunications Standard Institute (ETSI) and are incorporated in their entirety by reference herein. In GSM, the mobile terminal's power level is controlled by the base station. The algorithm used by the base station is quite complex. To put it simply, the base station takes two measurements, called RXQUAL and RXLEV, based on the received signal. These measurements are used to determine the transmit power level for the mobile terminal. RXQUAL is based on bit error rates (BER) and RXLEV is based on the strength of the received signal. These measurements are generally taken over one complete SACCH period. Once the base station determines the appropriate power level for the mobile terminal, it sends a signaling message to the mobile terminal to tell it to adjust its transmit power level. The mobile unit has no part in deciding its transmit power level. While this method of power control works well in land-based cellular systems for which GSM was developed, it has shortcomings when applied in a mobile satellite communication system.

In a land-based cellular system, the propagation time for the transmission of a signal is relatively short. In a satellite system, the signal travels great distances before reaching its intended receiver. Consequently, there is a substantial propagation delay in satellite communications. The power control method used in GSM does not take into account these propagation delays. If, for example, the base station sends a message to the mobile terminal telling it to increase its power, the mobile station will not receive the message until approximately four SACCH cycles later. By that time the mobile station might be out of its disadvantaged location. The mobile unit would then transmit at a power level that is greater than the minimum needed to assure a desired signal quality which will result in an unnecessary drain on the mobile units battery. Conversely, if the base station commands the mobile terminal to reduce its transmit power because of favorable conditions, the designated transmit power level might be too low to maintain the desired signal quality by the time the mobile terminal receives the command.

Accordingly, there is a need for a new power control method that is specifically designed for use in a satellite system and takes into account the long propagation delays of a satellite system.

SUMMARY OF THE INVENTION

The present invention is a method for controlling the transmit power in a mobile radio communication device in a satellite communication system. The power control method of the present invention comprises both a closed-loop element and an open-loop element. For the closed-loop element, the base station calculates a power control constant for the mobile terminal based on the strength of signals received from the mobile terminal. The base station takes into account the propagation delays of the satellite system in determining the mobile terminal's transmit power level. The mobile terminal uses the power control constant to calculate its transmit power so that changing the power control constant causes a corresponding increase or decrease in the mobile terminal's transmit power.

The open-loop element of the power control method allows the mobile terminal to adjust its own transmit power level based on the strength of signals received from the base station while it waits for a new transmit power setting from the base station. It is assumed that the path loss on the uplink will be the same as the path loss on the downlink. If the power of the received signal diminishes on the down-link without any change in the transmit power level, it is assumed that the path loss is increasing. The mobile unit monitors the signal received from the base station and varies its transmit power level inversely in accordance with observed variations in the signal strength of signals received in the previous frame.

When discontinuous transmission (DTX) is employed in order to conserve power, transmissions are silenced in the direction not currently speaking. According to one aspect of the invention, one frame in every 13 TDMA frames always contains an active transmission of SACCH information even when DTX is used. The SACCH information is preferably transmitted at a constant power level to provide a stable signal strength reference point. The SACCH occurring one frame in thirteen does not allow fast control of the uplink power level since the 12 intervening frames receive no separate power control information. According to another aspect of the invention, the mobile terminal may receive a SACCH signal in a timeslot other than its allocated timeslot in order to determine if the path loss is varying. The alternate slot used for this purpose is preferably as close as possible in time to the mobile terminal's assigned transmit slot without causing difficulty in switching from receive to transmit sufficiently rapidly.

DETAILED DESCRIPTION OF THE INVENTION

Figure 1:
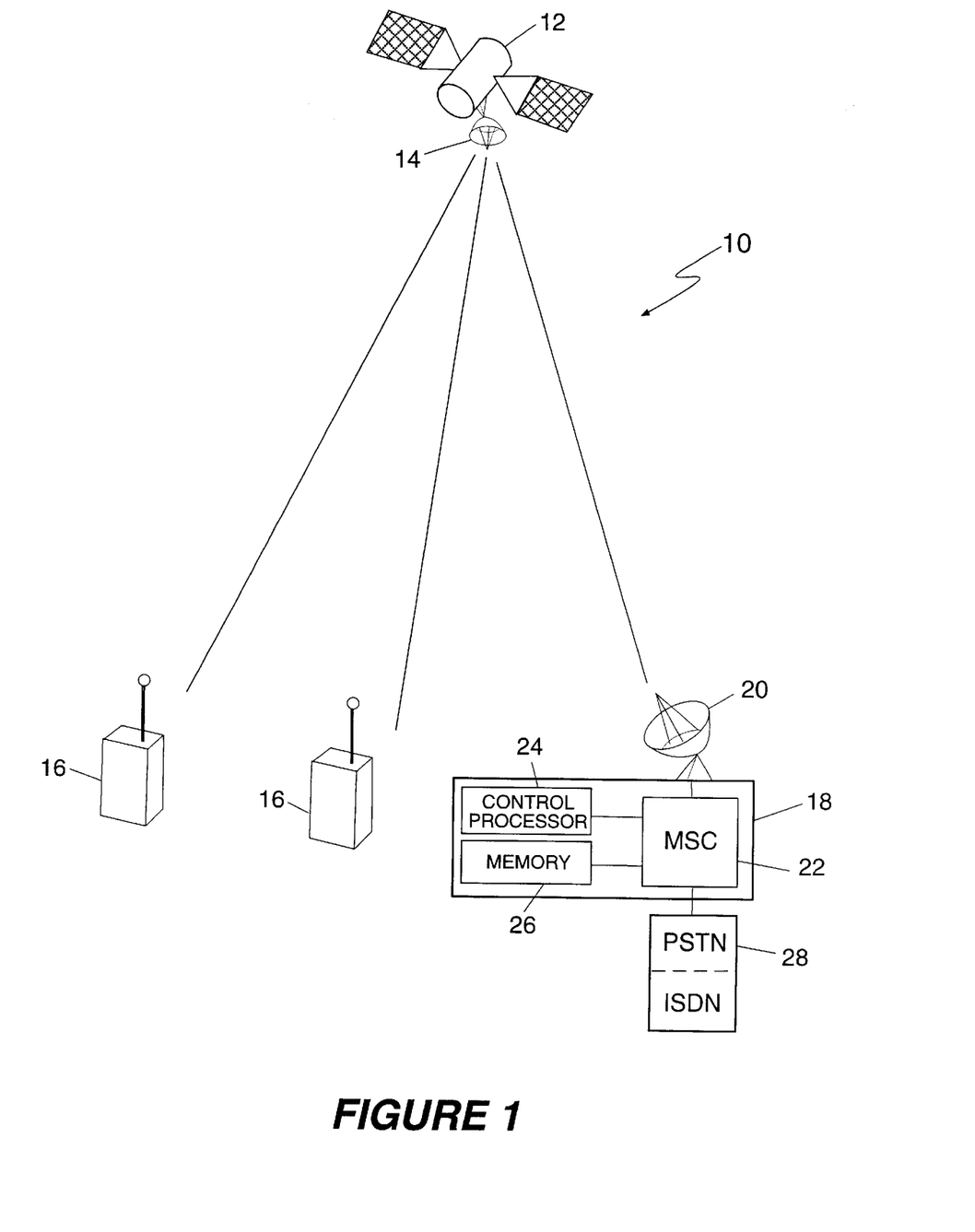
FIG. 1 is an illustration showing the major elements in a satellite communication system.

Referring now to the drawings, the power control method for controlling the transmit power of a mobile terminal in a satellite communication system will be described. A mobile satellite communication system which utilizes the power control method of the present invention is shown in FIG. 1 and is indicated generally by the numeral 10. The satellite system 10 includes a space-based satellite 12 having an antenna 14 which projects one or more spot beams onto the surface of the earth to provide a communication medium for communications between earth stations. The earth stations in a satellite communication system include both mobile stations 16 and at least one base station 18. The base station 18 includes a mobile switching center (MSC) 22 which provides a connection to the public switched telephone network (PSTN) 28, or other terrestrial network. The MSC 22 includes a control processor 24 and memory devices 26 to control its operation and to handle signaling as will be hereinafter described. Since the basic architecture of satellite communication systems is well known to those skilled in the art, further discussion of the same is omitted.

Figure 2:
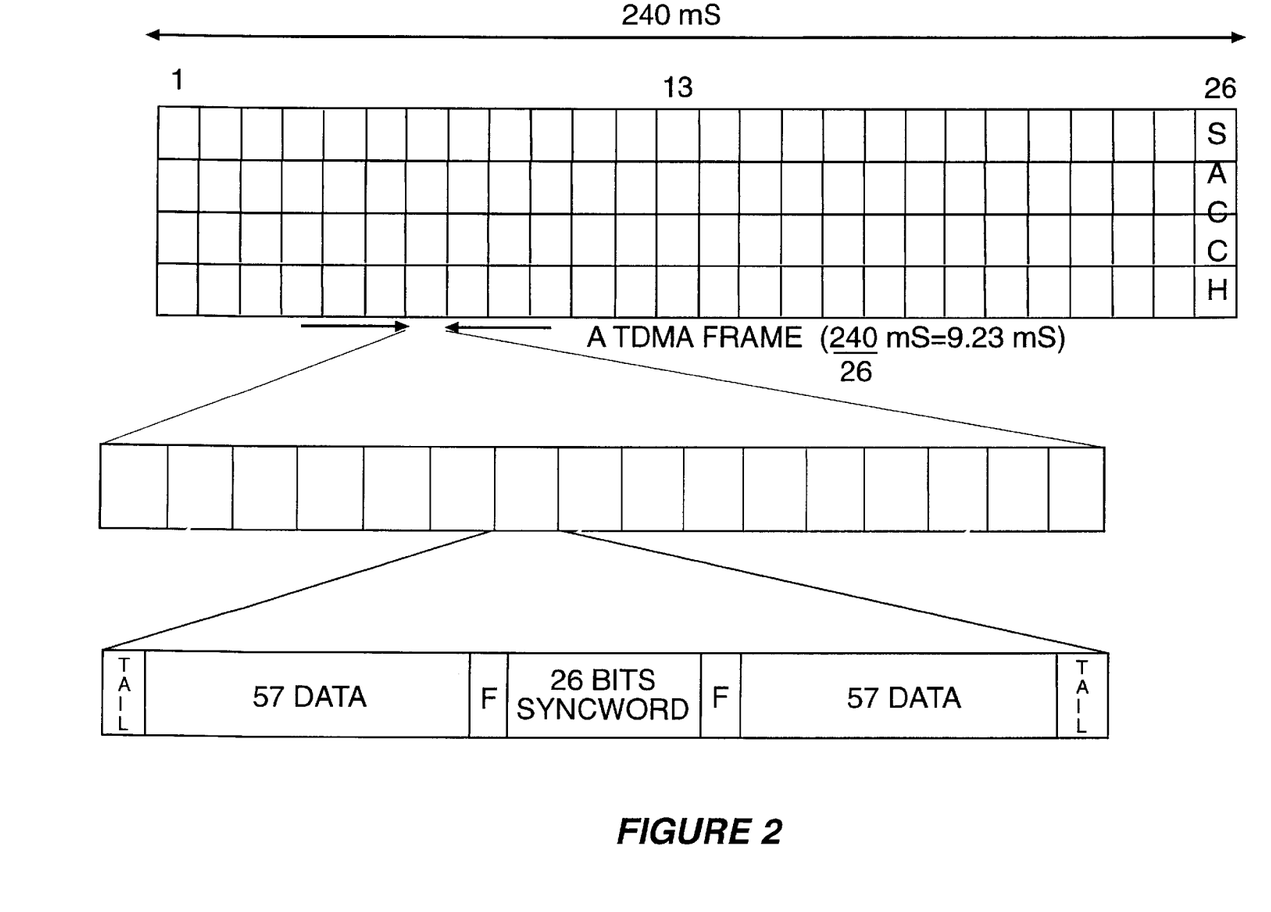
FIG. 2 is an illustration showing a TDMA frame used in the satellite system of the present invention.

FIG. 2 illustrates a TDMA transmission format employed in the satellite system of the present invention. In the satellite application, the GSM frame structure is modified to comprise 13 frames of 16 slots in which every 13th frame is an SACCH frame. A multiframe, indicated generally at 50, comprises 26 TDMA frames 52. In each multiframe 50, the first 12 frames 52 carry traffic information. The fourteenth through twenty-fifth frames 52 also carry traffic information. The thirteenth and twenty-sixth frames 52 each carry one eighth of a Slow Associated Control Channel message (SACCH). Four multiframes 50 are required to complete delivery of one SACCH message, while each multiframe 50 delivers sixteen, 20 mS speech vocoder datablocks. Each 20 mS block of coded data representing a segment of the speech waveform is spread over three consecutive TDMA frames 52 in a process known as block-diagonal interleaving. Each TDMA 52 frame can be transmitted on a different frequency using frequency hopping to obtain the benefit known as interference averaging or interferer diversity.

Figure 3:
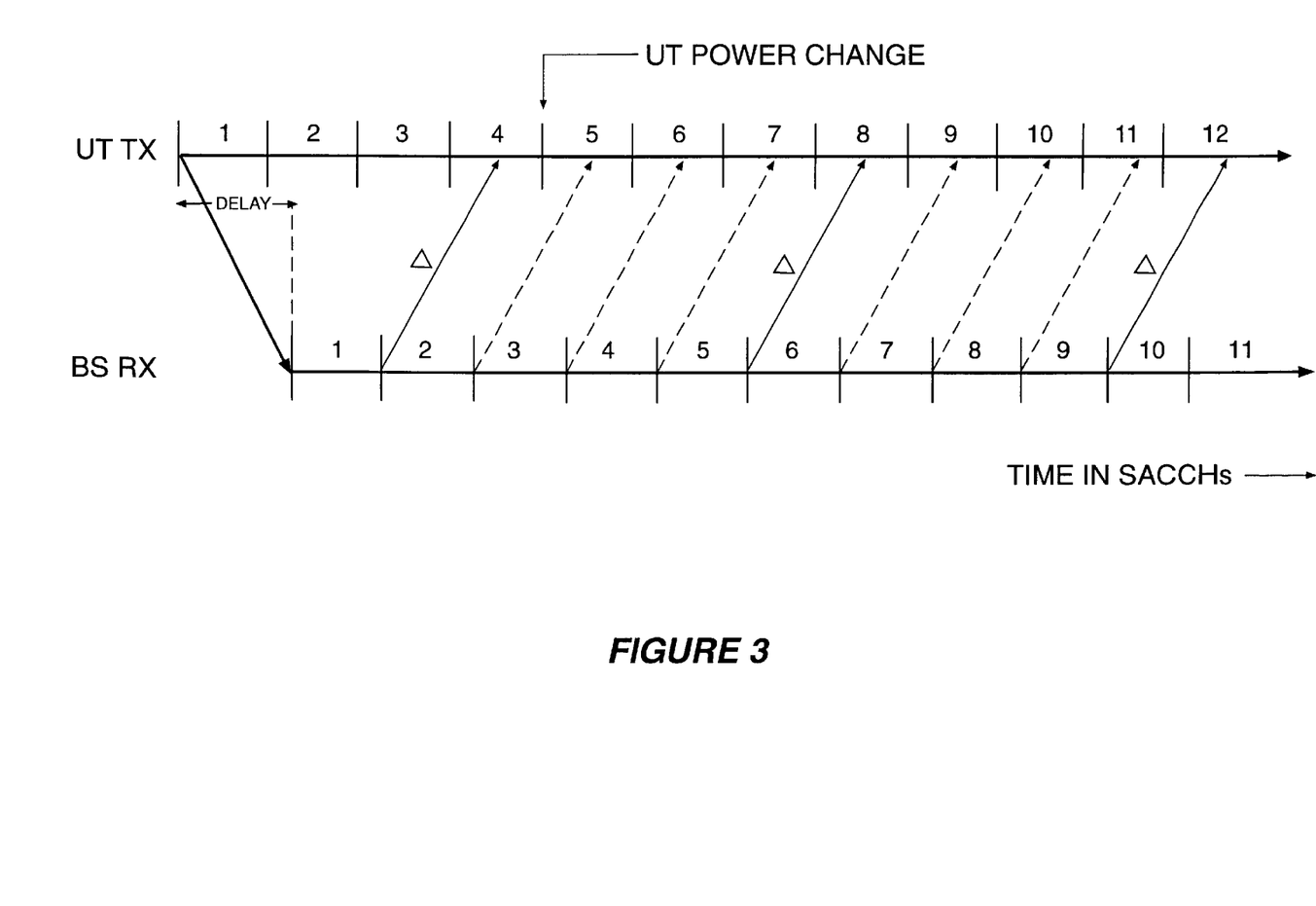
FIG. 3 is an illustration showing the propagation delays in a satellite communication system.

The SACCH message facility is used to transmit power control information to and from the mobile terminal. In a typical GSM system, the base station determines the appropriate transmit power level for the mobile terminal based on the average received signal strength over one entire SACCH period and sends a SACCH message to the mobile terminal to command the mobile terminal to set its transmit power level to the specified level. The timing diagram shown in FIG. 3 illustrates the delays involved when this method of power control is used in a satellite system. It takes approximately 960 mS to transmit the SACCH message and 240 mS for the signal to propagate. Once the base station receives the SACCH signals, it needs some time to calculate the new power setting for the mobile terminal based on the signal strength of the received SACCH signals. The base station begins transmitting a SACCH message containing the new power setting on the next SACCH cycle. It takes another 960 mS to transmit the SACCH message and 240 mS for the signal to propagate before it is received by the mobile terminal. The mobile terminal begins transmitting at the new power level at the beginning of the next transmit slot.

By the time the mobile station receives its transmit power setting from the base station, the conditions may have changed substantially from the conditions that existed when the original SACCH signals on which the power setting is based were transmitted from the mobile terminal to the base station. Because of the delay, the adjustment may no longer be needed by the time that the new power setting is received by the mobile terminal. For example, assume that the base station notices a substantial drop in the RSSI from the mobile terminal reflecting an increase in the path loss between the mobile terminal and the base station. The base station calculates a new power setting based on the average RSSI over one SACCH period and then sends a message to the mobile terminal telling it to increase its transmit power. By the time the mobile terminal receives the new power setting it may already be out of its disadvantaged location. This would cause the mobile terminal to transmit at a power level greater than what is needed to maintain the minimum desired signal quality thus wasting power. Moreover, the excessive power increases the amount of co-channel interference that will be experienced by other users in the system. Conversely, if the base station notices an increase in the RSSI from the mobile terminal resulting from favorable conditions, it will instruct the mobile terminal to reduce its transmit power level. If the favorable conditions no longer exist when the new power setting is received at the mobile terminal, then the mobile terminal may transmit at a power that is insufficient to maintain the minimum desired signal quality.

To avoid the power control problems resulting from the long delays in satellite communications systems, the present invention uses a dual method of power control including both a closed-loop element and an open-loop element. Closed loop power control is a function of the base station. The base station sends power control messages to the mobile terminal which causes the mobile terminal to either raise or lower its transmit power. Open loop control is carried out by the mobile terminal. The mobile terminal is allowed to vary its own transmit power based on variations in the strength of the signal received from the base station. It is assumed that the path loss on the uplink will be the same as the path loss on the downlink. If the mobile terminal sees a drop in the strength of the received signal (indicating an increase in the path loss between the base station and the mobile terminal), it will increase its transmit power. Conversely, if the mobile terminal sees an increase in the strength of the received signal (indicating a decrease in the path loss between the base station and the mobile terminal), it will lower its transmit power accordingly.

In the closed-loop element of the power control method, the base station determines the value of a power control constant for the mobile terminal based on the quality of the signals received from the mobile terminal. The base station transmits the power control constant to the mobile terminal using the SACCH message facility. The mobile terminal receives a new power control constant once every SACCH cycle and uses the power control constant to calculate its transmit power setting according to the following equation:

$$TX\ \text{POWER LEVEL} = \text{CONSTANT} - \text{RECEIVED SIGNAL LEVEL}$$

where quantities are expressed on a logarithmic scale (e.g. decibels). This equation indicates that the mobile terminal will vary its own transmit power inversely in accordance with observed variations in received signal strength to provide open loop control over the transmit power. This equation also indicates that a change in the power control constant will result in a corresponding change in the transmit power of the mobile terminal for all values of received signal strength.

The RECEIVED SIGNAL LEVEL is measured by the mobile terminal by averaging over each received timeslot, and these slot averages may be subject to further averaging depending on a time constant which may also be modified by a SACCH command from the base station.

The open-loop control element allows the mobile terminal to vary its own transmit power during the period between receipt of two complete SACCH messages from the base station (which is approximately one second).

Description of Mobile Terminal

Figure 4:
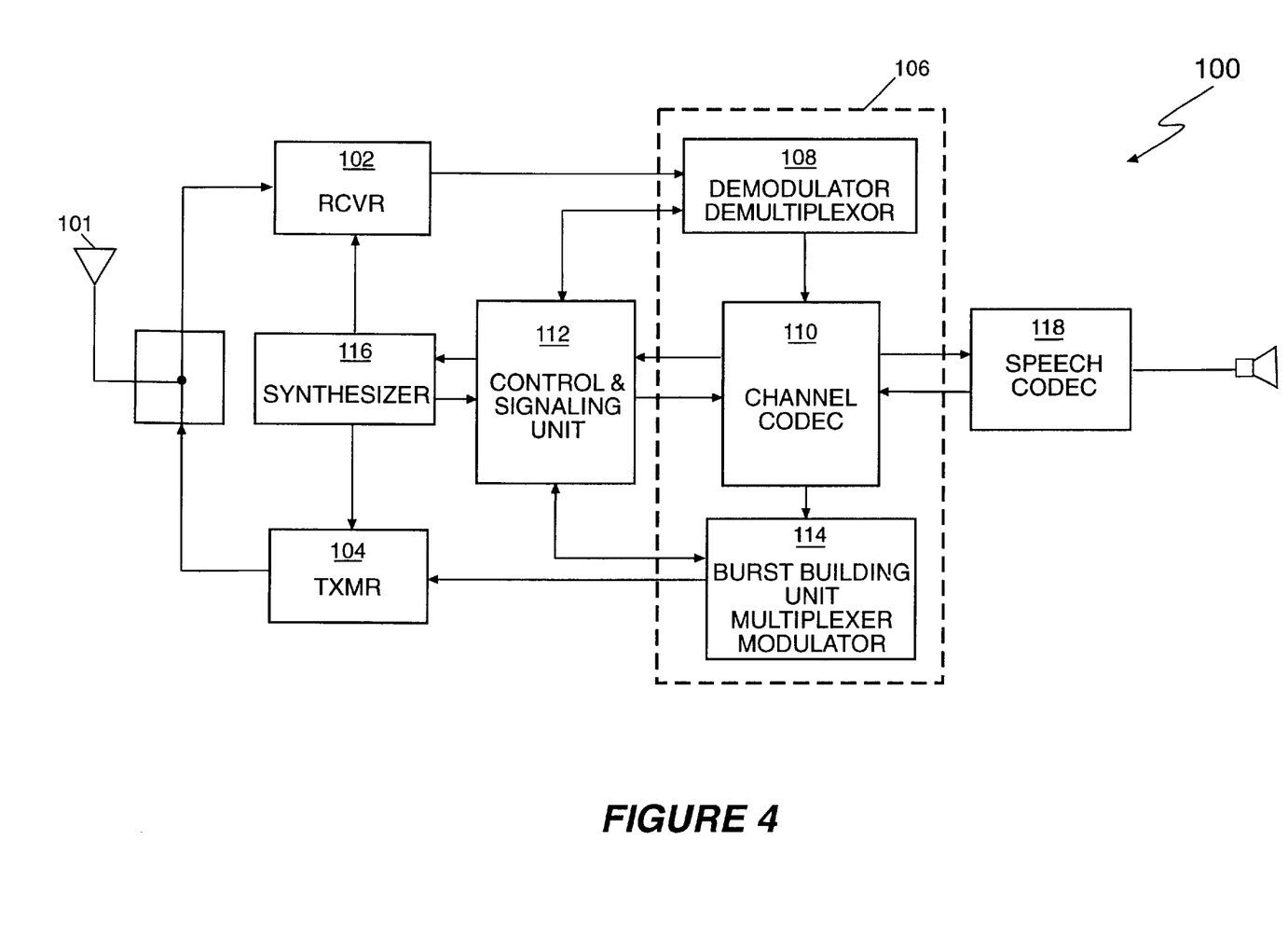
FIG. 4 is a block diagram illustrating the components of a mobile terminal.

Referring now to FIG. 4, there is shown a schematic diagram of a mobile terminal which utilizes the power control method of the present invention. The mobile terminal is indicated generally by the numeral 100. The mobile terminal 100 includes a burst receiver 102 to receive transmitted signals and a burst transmitter 104 for transmitting signals. A signal processing unit 106 processes signals passed to it by the receiver 102 and prepares signals for transmission by the transmitter 104. The signal processing unit 106 includes a received signal processor 108, a transmit signal processor 114, and a channel codec 110. The received signal processor 108 includes a demodulator and demultiplexer (indicated collectively by the numeral 108) to extract the transmitted bit stream from a received burst and to sort the received information from the different time slots and frames into their appropriate logical channels. The received signal processor also includes a power measurement circuit to measure the strength of the received signal, and a bit error determination circuit to determine received information quality. The power and quality measurements are passed to the control and signaling unit 112. A channel codec 110 decodes the bit sequence coming from the received signal processor 108. If the decoded bit stream is a speech frame, then the channel codec passes it to the speech codec 118. If the decoded bit stream is a signaling frame, it is passed to the control and signaling unit 112.

The control and signaling unit performs all of the control functions of the mobile terminal. These functions include power control, and channel selection. To perform its control functions, the control and signaling unit 112 exchanges signaling messages with the base station or network. These signaling messages are prepared or processed in the control and signaling unit 112 and are passed to or received from the channel codec 110.

The burst building unit, multiplexer and modulator (indicated generally by the numeral 114) prepare signals for transmission. The burst building unit places coded bit sequences received from the channel codec 110 in the appropriate burst structure and then adds the necessary training sequence bits, tail bits, and stealing flag. The multiplexer assigns each individual burst to a timeslot in a numbered frame. After the bit sequence is sorted and ordered the modulator impresses the bit sequence on the carrier frequency for transmission by the transmitter 104.

The frequency synthesizer 116 provides the internal timing references for the bit and frame clock as well as for the RF sources in the receiver and transmitter. A voltage controlled oscillator assumes a stable operating frequency as commanded by the control and signaling unit 112.

The control and signaling unit 112, as previously mentioned, performs the power control functions for the mobile terminal. The power control functions are performed by a software routine within the control and signaling unit 112. As will be apparent to those skilled in the art, the power control function may be performed in a time-shared processor performing other functions at different times. The power control algorithm processes the signaling messages together with the received signal strength and quality measurements to determine a power level for transmitting the next signal burst.

Description of Power Control Algorithm

Figure 5:
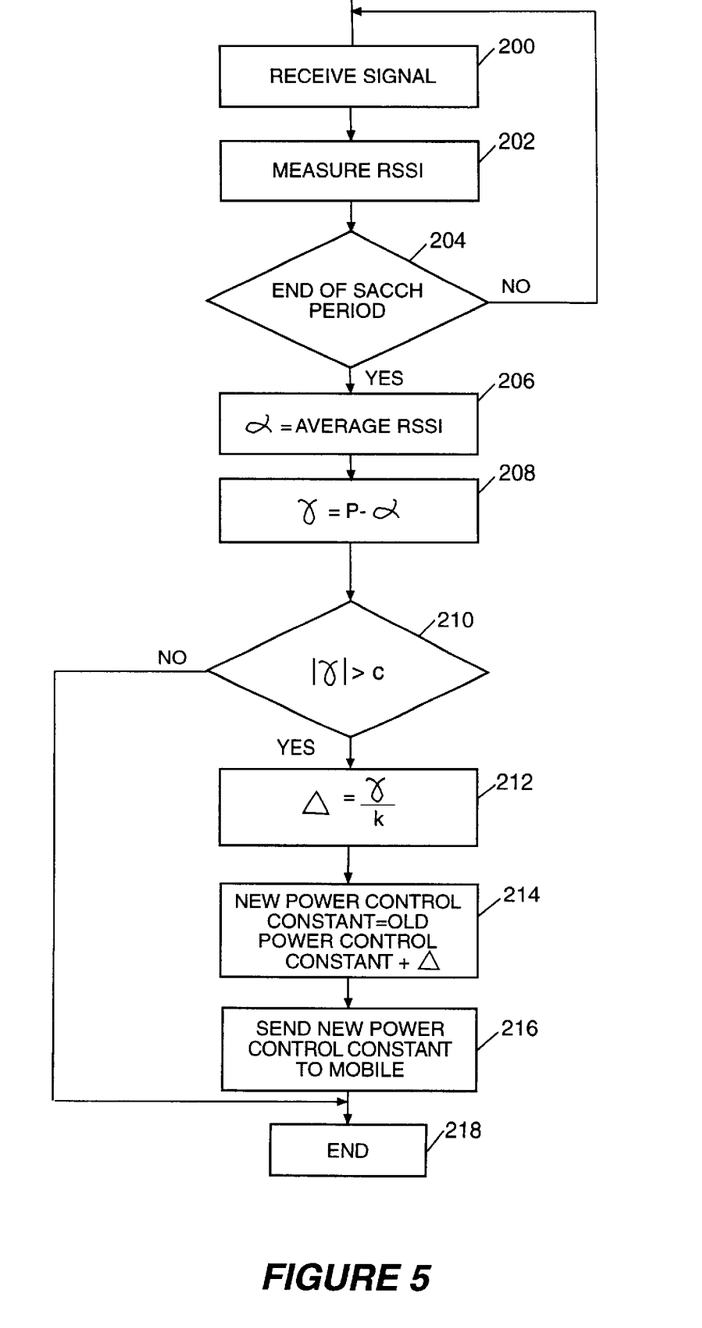
FIG. 5 is a flow diagram illustrating the closed-loop portion of the power control method.

Referring now to FIG. 5, a flow diagram is shown illustrating the closed-loop element of the power control method. The base station receives a signal from the mobile terminal 100 (block 200) and measures the RSSI of the signal (block 202). After one full SACCH period (block 204), the base station averages the RSSI values of the signals received over the SACCH period (block 206). The base station calculates the difference (designed as y) between the average RSSI value of the received signals and the desired receive power p (block 208). This difference is referred to herein as the power deviation value. The power deviation value $\gamma$ is compared to a predetermined threshold power differential (designed as c) (block 210). If the absolute value of the power deviation value $\gamma$ exceeds c, then the base station calculates a new power control constant for the mobile terminals (blocks 212 and 214) and transmits the new power control constant to the mobile terminal using the SACCH message facility (block 216). To obtain the new power constant, the base station divides the power deviation value $\gamma$ by a predetermined delay factor k (block 212) and adds the resulting value to the previous power control constant for the mobile terminal (block 214). The delay factor k will usually be a small integer such as 4. The value of the delay factor k can be left to the discretion of the system operator and may, for example, be set according to step size.

Because of the delay factor, the base station will not attempt to correct large swings in received power in one step. If there is a sudden drop in receive power at the base station due to shadowing, the base station will increase the transmit power level in increments while the effects of shadowing are experienced. This incremental increase prevents large swings in the transmit power over short intervals of time and thus prevents the base station from overreacting to transitory changes in signal strength.

The base station also receives reports from the mobile terminal of the quality of the signal received by the mobile terminal from the base station. If the quality is too low, the base station will increase the power it transmits to that mobile terminal for the whole of the next SACCH period. Then, in recognition that the mobile terminal's open loop power control system will reduce the mobile terminal's transmit power when it detects an increase in signal level from the base station, the base station must adjust the power control constant it transmits to the mobile station by the same amount in order to avoid unwanted interaction between the downlink power (base transmit power) control loop and the uplink power (mobile transmit power) control loop.

If discontinuous transmission (DTX) is employed, the mobile terminal 100 will continue to transmit SACCH signals at a power level (e.g. maximum power level) in one out of every thirteen frames. The base station can measure the RSSI of the SACCH signals and use these measurements to calculate the path loss from the mobile terminal as the SACCH is transmitted with known power. The path loss can be used to compute the appropriate power level for the mobile to transmit the traffic channels when not in DTX mode. Of course, this can be done directly without necessarily consulting an intermediate value equal to the path loss, which was mentioned as an aid to understanding the physical system.

Figure 6:
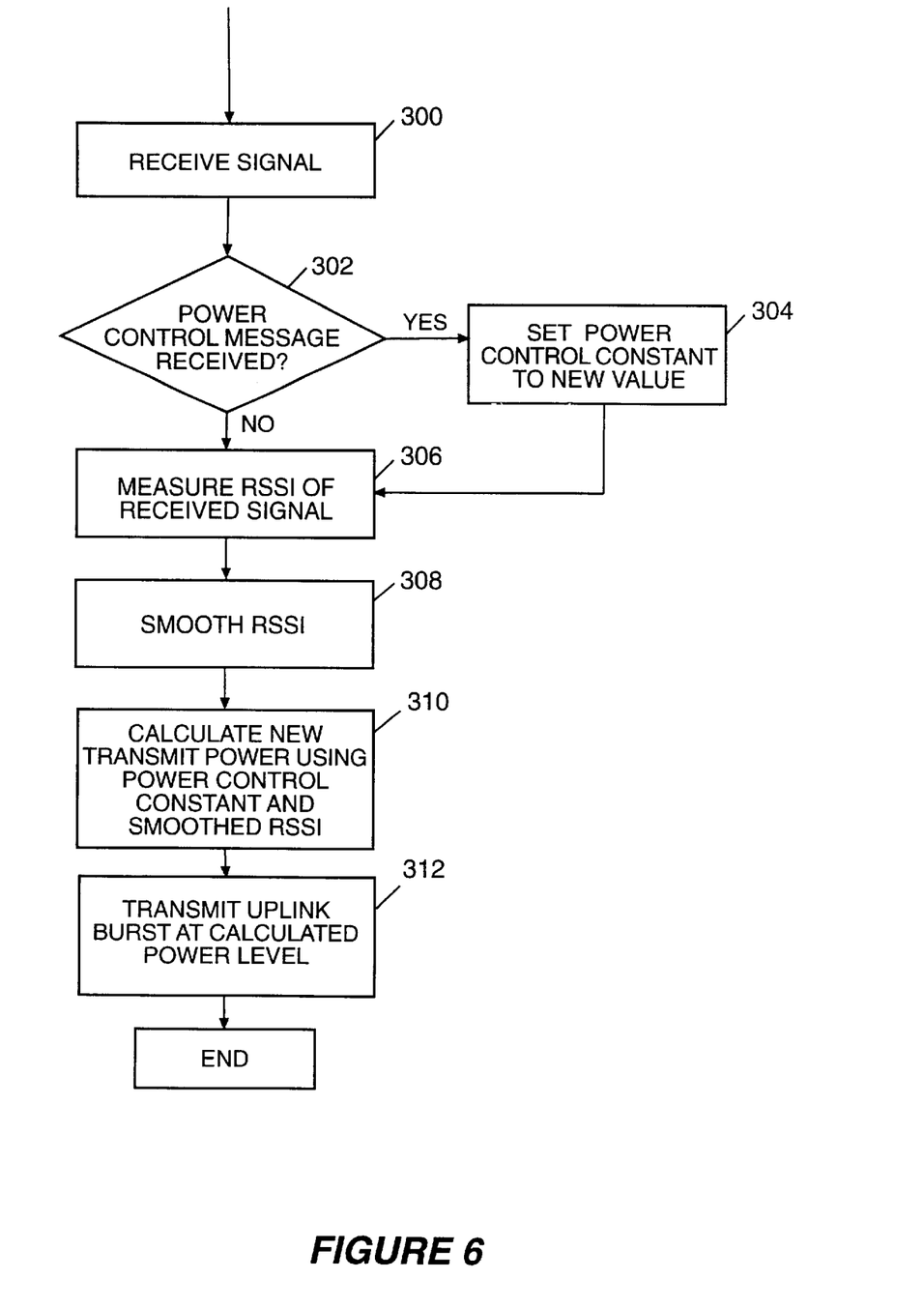
FIG. 6 is a flow diagram illustrating the open-loop portion of the power control method.

The open-loop element of the power control method is shown in FIG. 6. The mobile terminal 100 receives signals on the down-link from the base station (block 300). If the signal completes a SACCH message (block 302) then the mobile terminal sets a power control constant accordingly (block 304). The mobile terminal 100 then calculates the RSSI of the down-link transmissions (block 306) and smoothes the RSSI values of the down-link signal (block 308). The smoothing algorithm gives more weight to the most recently received signal on the down-link than earlier signals. The smoothed value based on the RSSI of the received signals (called RX_NEW) is then used to calculate the new transmit power level in block 310. RX_NEW is subtracted from the desired receive power P to obtain a power correction value Pcor. The power correction value Pcor is then added to the power control constant provided by the base to obtain the transmit power for the next transmit slot. In block 312, the mobile transmits using the transmit power level calculated in block 310. The power setting is adjusted in this manner from frame to frame using the previously received power control constant until a new power control constant is received from the base station. The result is that the transmit power will vary inversely with the RSSI of the received signal. If the RSSI of the received signal decreases, then the transmit power of the mobile terminal is increased by a corresponding amount. Conversely, if the RSSI of the received signal increases, then the transmit power of the mobile terminal is decreased by a corresponding amount.

Figure 7:
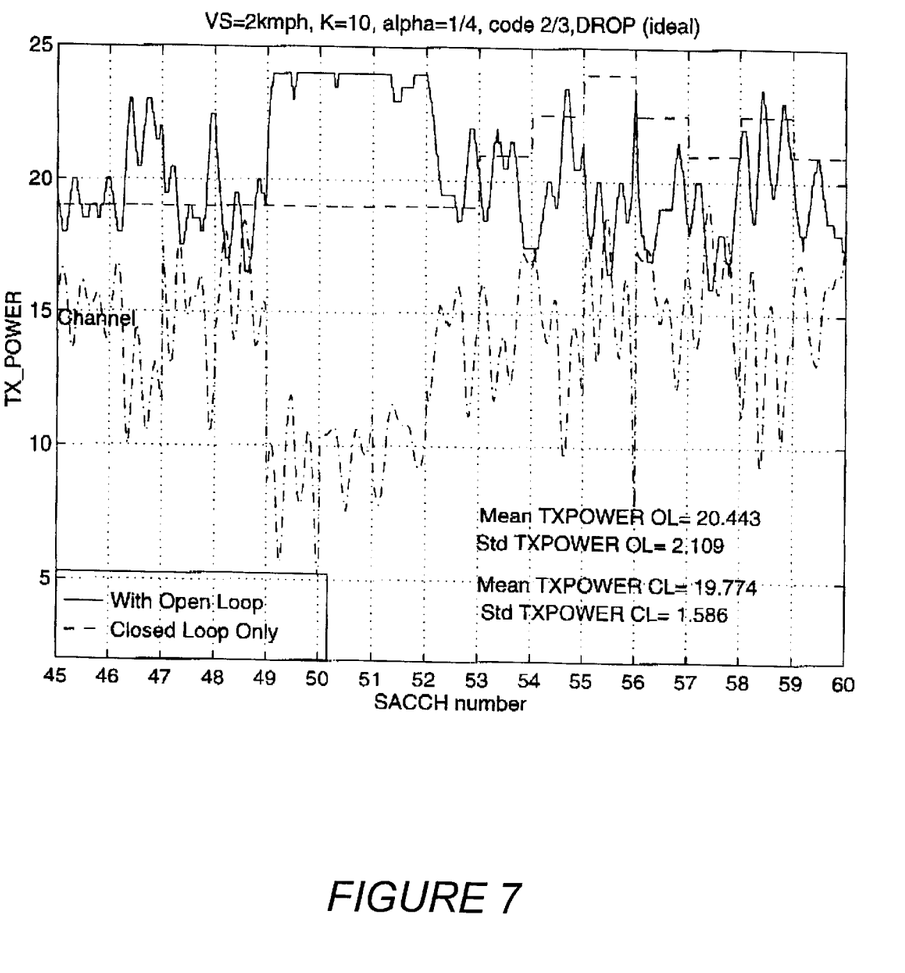
FIG. 7 is a graph comparing the combined closed-loop/open-loop power control method of the present invention with a closed-loop only power control method.

The open-loop element of the control method allows the mobile terminal to respond in more timely fashion to variations in path loss which are attributable to shadowing. Although shadowing effects are relatively slow, the delays inherent in a satellite system make timely response by the base station impossible. FIG. 7 is a graph showing a simulation of a computer comparing the transmit power level of a mobile terminal using only closed-loop power control with a mobile terminal using both closed-loop and open-loop power control. As shown in the graph, a drop in receive power occurred in the 49th SACCH cycle of the simulation. The mobile terminal using only closed-loop power control did not react until the 53rd SACCH cycle. The mobile terminal using both open-loop control and closed-loop power control reacted almost immediately to the drop in power. It is apparent, therefore, that the open-loop element makes the mobile terminal better able to respond to variations in path loss caused by shadowing.

If the base station detects a lack of correlation between signal quality reported by the mobile and signal level received from the mobile, this may be indicative of uncorrelated up and down link fading. When this is detected, the base station can send another SACCH command to change the smoothing algorithm at block 310 to use a longer smoothing time constant. Otherwise, the base station may send an SACCH message to reduce the time constant used in block 310 when it estimates that up and downlink fading are more correlated, in order to speed up the open-loop part of the power control algorithm.

In the discussion thus far, it has been assumed that the base station transmits a signal continuously to the mobile station. This assumption may not always be correct. When discontinuous transmission is employed, transmissions are silenced in the direction not talking. The reason for using discontinuous transmission is to conserve power when it is not needed. The power control method of the present invention can be adapted for DTX mode.

To enable open-loop power control in DTX mode, one frame in every thirteen TDMA frames always contains an active transmission of slow associated control channel information. The SACCH signals are transmitted at a known power level to provide a signal strength reference point. The SACCH information may, for example, be transmitted at a constant level which is known to the mobile terminal, which may also be an upper-level for transmissions of SACCH's. Alternatively, a down link power report can be sent to the mobile terminal as part of a SACCH message to inform the mobile terminal of the transmit power level used by the base for SACCH transmissions. When the base transmit power level is known, the mobile may compute the path loss from the base station or satellite and then use the path loss to compute an appropriate level for transmitting traffic information. Of course, this may also be calculated without necessarily computing an intermediate value equal to the path loss.

The SACCH occurring one frame in every thirteen does not allow fast control of the transmit power level for the mobile terminal since the twelve intervening frames receive no separate power control information. Therefore, the mobile terminal may choose to receive a signal in a timeslot other than its own allocated receive timeslot in order to determine if the path loss is varying. This timeslot switching is illustrated in FIG. 8.

Figure 8:
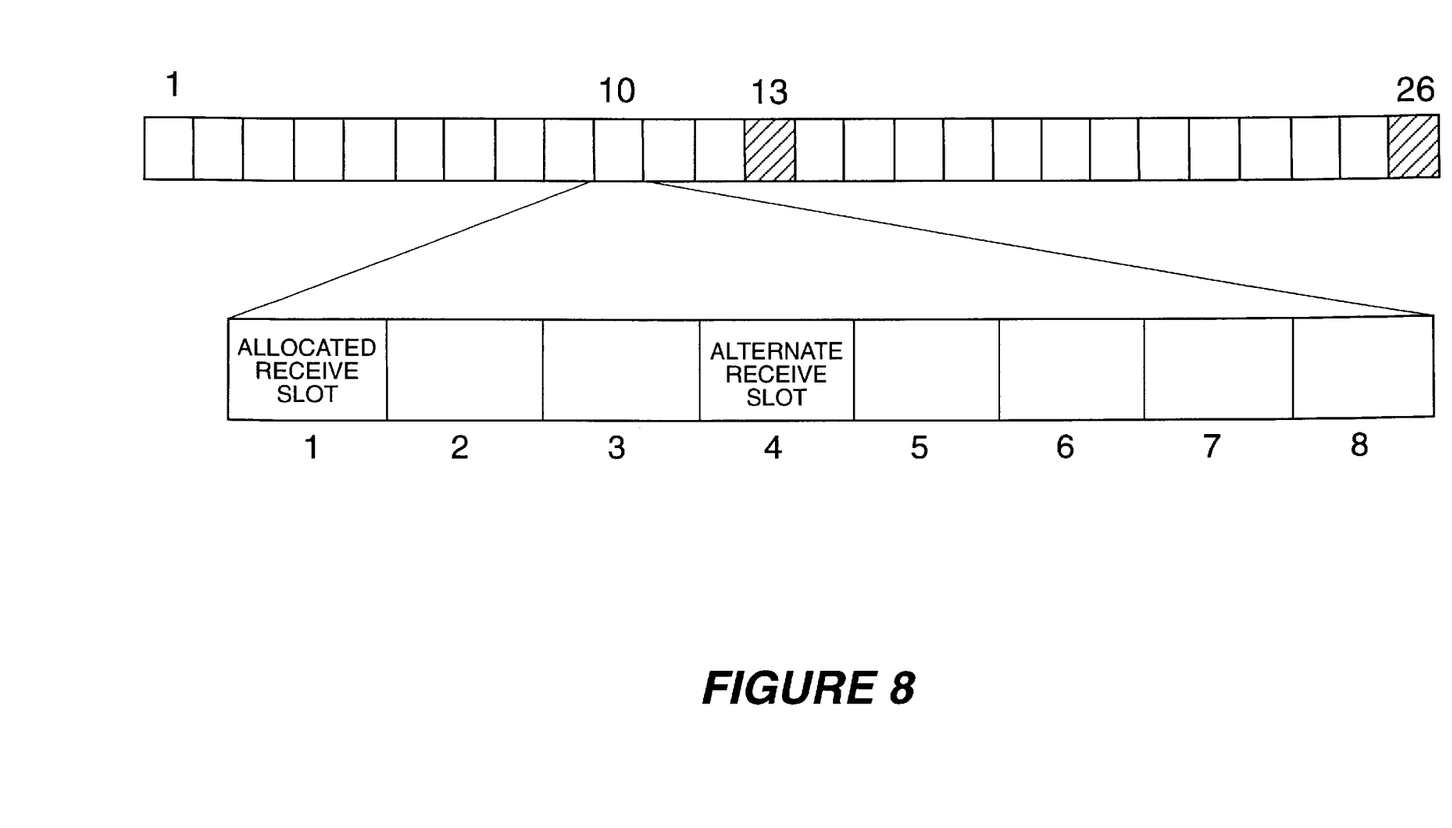
FIG. 8 is an illustration of a TDMA frame.

As shown in FIG. 8, the mobile station is allocated the first slot in each frame to receive transmissions from the base station (i.e., down-link communications). If the base station does not transmit information during the mobile terminal's allocated receive slot because the user at the other end is not talking, then the mobile terminal can switch to an alternate slot (for example, slot 4) which is a receive slot allocated to some other mobile terminal. Since other timeslots contain information that is of no interest to the mobile terminal in question, the signal does not have to be completely demodulated. It is sufficient to make an RSSI measurement of the signal strength received in the alternate slot. The slot used for this purpose is preferably a slot as close as possible in time to the mobile station's transmit slot while leaving sufficient time to switch from receive to transmit mode.

The signal in the alternative timeslot is transmitted with unknown power. Therefore, the first frame received in the alternative timeslot does not provide sufficient information on which to make power adjustments. Data from at least two frames, preferably consecutive, are needed to determine whether the path loss is varying. As an alternative to receiving another timeslot on the same carrier frequency, the mobile can use its frequency agile synthesizer to receive a slot on a different carrier frequency on which unrelated calls are taking place. The carrier frequencies available in a particular cell or satellite beam would have been previously read from the system's broadest control channel. In particular, the mobile can choose the carrier frequency, from among those available, which another call's SACCH slot coincides with, or is close in time to, the mobile's own reception timeslot. The likelihood of finding such an SACCH slot is enhanced by deliberately staggering the frame on which the SACCH is transmitted as between different carriers, which is in any case desirable to avoid all SACCH transmissions coinciding, with consequent high peak power demand from the satellite transponder. Thus, when a cell or beam contains 13 carrier frequencies, one carrier is always carrying an SACCH transmission to some mobile terminal and preferably at a known power level.

In one embodiment, the RSSI value of the first frame received in the alternate slot is compared with the immediately preceding SACCH burst in the mobile terminal's own timeslot and the difference is determined and stored as a calibration of the power level of the alternate slot relative to the known SACCH power level. The RSSI measurement on each succeeding frame in the alternative slot is then corrected using this difference. The corrected RSSI value of each succeeding frame is compared to the immediately preceding frame to determine if the path loss if varying. The transmit power of the mobile terminal is varied inversely according to the adjusted RSSI of the signal on the alternate channel. The mobile terminal only needs to measure RSSI, and not decode, the alternate slot, and can thus conserve its decoding resources for continuing to process signals in its own slot in order to detect when DTX ceases and transmission of speech or data resumes.

As an alternative, it may be sufficient to observe whether the alternative slots RSSI has increased or decreased from frame to frame, and to apply the same increase or decrease, appropriately inverted, to the transmit power level without first correcting the RSSI value as previously described. An accumulation of such delta changes has a tendency to slowly drift away from a correct absolute value, but the absolute power value may be corrected every time a SACCH burst of known reference power is received thus limiting the drift to thirteen frames or 120 milliseconds. Thus, the drift is insignificant.

Another method which might be employed when discontinuous transmission is used would be to allow the mobile unit to hop to a different carrier frequency on each of the 12 intervening frames to receive a SACCH signal in each of the 12 intervening frames. If the SACCH signals are transmitted at a constant power, then the mobile terminal can determine the path and thus determine if it has varied.

Figure 9:
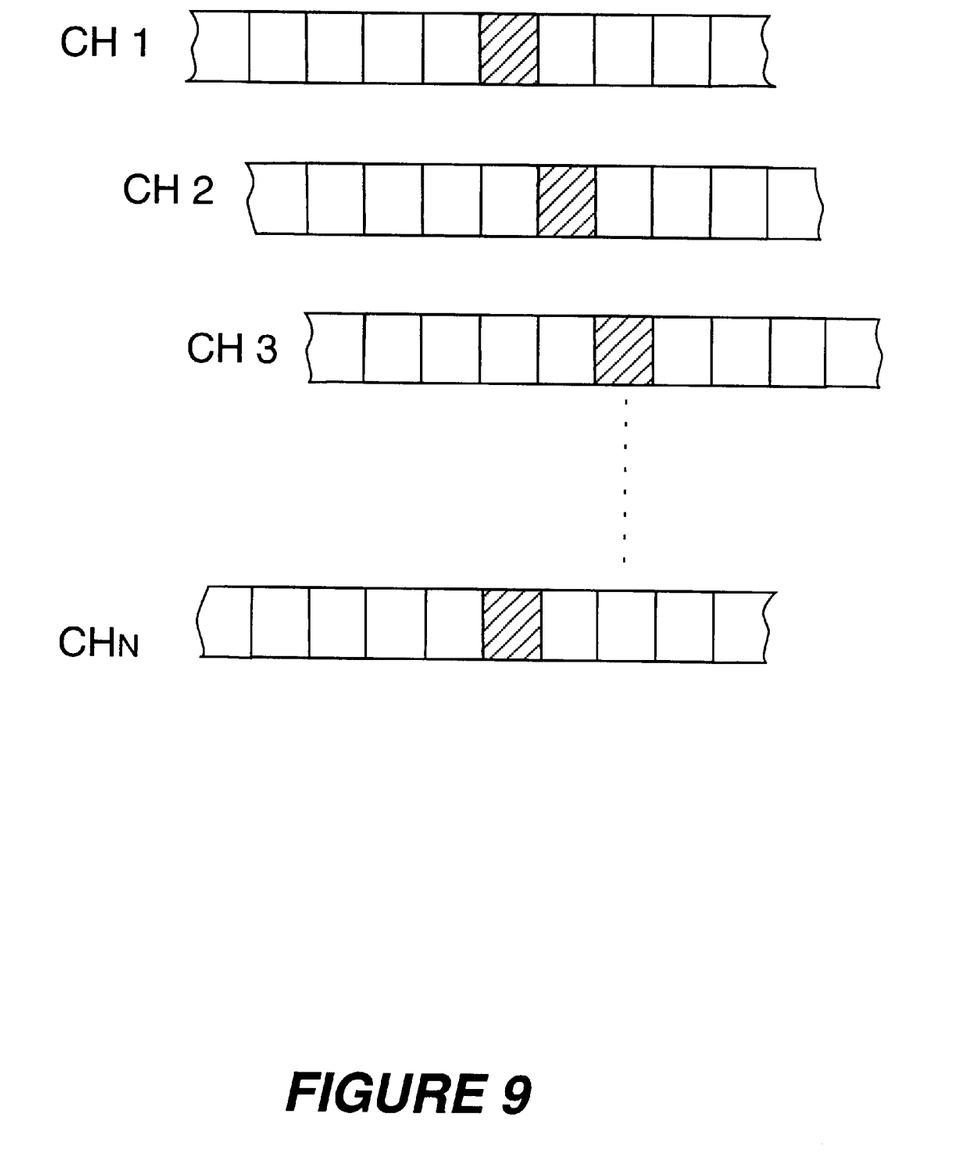
FIG. 9 is an illustration showing the relative frame timing on different channels in a TDMA system.

This frequency hopping scheme is illustrated in FIG. 9. As shown in FIG. 9, the mobile terminal receives a SACCH signal in its own allocated receive slot in frame 13. If a transmission is not received in frame 14, then the mobile terminal switches to an alternate channel (in this case channel 2) to receive a SACCH signal in the alternate channel. The mobile terminal switches to a third channel on frame 15 if it does not receive a signal in its own allocated timeslot. The mobile terminal can hop from channel to channel in this manner to receive a SACCH signal on each visited channel. If the SACCH signals on all channels are transmitted at a constant power setting, then the mobile terminal can determine whether the path loss is varying by comparing the SACCH signal received in each frame to the SACCH signal received in the previous frame even though the SACCH signals are received on different channels. In order to employ this method, the mobile terminal would preferably obtain information from the broadcast control channel giving the relative timing stagger of SACCH transmissions on different carrier frequencies.

The invention may also be adapted advantageously to determine transmit power levels for mobile radios in a landmobile radio system of the type known as trunked radio. Trunked landmobile radio differs from conventional landmobile radio in that the users do not receive a permanent frequency allocation. Instead, a number of users or user groups pool a smaller number of frequencies. Typically, each pooled frequency is actually a pair of frequencies, one for transmitting in the base to mobile (downlink) direction and the other for transmitting in the mobile to base (uplink) direction; this arrangement is called "two-frequency simplex."

One of the shared downlink frequencies is used to broadcast control messages to the mobile radios, and one of the pooled uplink frequencies is used to receive control messages from the mobile radios. When a particular user wishes to talk, he depresses the pressed switch (press-to-talk button) on the radio and the radio automatically transmits a channel request message on the uplink control channel, and then temporarily reverts to the receive state. The base station receives the message and immediately replies by transmitting an access grant message on the downlink control channel, the message indicating to the mobile radio the channel number of the next free channel that it shall use for the duration of that "over." The mobile radio then resumes the transmit state using the indicated channel number until the user releases the press-to-talk switch.

One problem that arises in prior art landmobile radio systems is that mobile radios can lie at large or small distances from the base station and thus may be received very strongly or very weakly. A very strongly received mobile signal can interfere with reception of a weaker one, particularly when the weaker one is using an adjacent frequency channel. The customary solution to this problem is either to design expensive radios with very high adjacent channel rejection, or else not to use adjacent channels within the same base station. Neither solution is favorable at the present state of the art and a better solution is to implement power control of the mobile transmit power so that signals are received by the base station at around a desired strength and not excessively strong.

According to the invention, a method is provided for determining the appropriate transmit power for a mobile radio to use.

In a trunked radio system, all mobiles listen to the downlink control channel in idle mode. If a member of their group becomes an active transmitter, the whole group receives the access grant message allocating a free channel to the transmitter. The rest of the group (i.e., the non-transmitting radios of the group) then tune to the downlink channel of the allocated channel pair in order to receive the message relayed from the transmitting radio by the base station.

Upon initiation of transmission, the transmitting radio remembers the signal strength (RSSI(o)) it was receiving on the control channel just before it went to transmit; an access request message is then transmitted by the mobile radio at a known power level P(o).

The base station measures the signal strength of the received access request and determines if it is too strong or too weak. The base station then sends an access grant message to the mobile radio comprising the number of a free channel it shall use and also an indication of the amount DELTA by which the received access request signal was too strong or too weak.

The mobile radio then makes the following computation:

$$\text{CONSTANT}(o) = P(o) - RSSI(o) + \text{DELTA}$$

in order to determine an initial power control constant CONSTANT(o). It then transmits on the assigned channel using a power given by:

$$P = \text{CONSTANT}(o) - RSSI$$

where RSSI is any of RSSI(o), or the signal strength at which the access grant message was received, or any subsequent measurement of signal strength received from the base station. In a TDMA landmobile radio system, mobile radios transmit in bursts occupying less than 100% of the time available and are able to momentarily revert to receive between transmit bursts to receive information from the base station. The information received can include timing information to maintain synchronism of the transmit bursts, frequency error information that can be used to maintain an accurate transmit frequency, and signal strength information which can be used according to this invention to update the power level P that shall be used for the next transmit burst. Periodically reverting to receive also provides the useful facility of PRIORITY INTERRUPT, where a radio nominally on transmit can be commanded to revert to receive in order to allow the user to receive a more urgent message. Even non-TDMA radios can advantageously be caused momentarily to revert to receive for a few milliseconds in order to determine if a more urgent communication is needed, which interruption causes negligible loss of voice quality while providing the opportunity to make a signal strength measurement with which to update the transmit power upon resumption of transmission.

What is claimed is:

1. An open loop power control method for controlling the transmit power of a mobile terminal using allocated timeslots in a repetitive frame period comprising:
   receiving a signal transmitted in a first timeslot of said frame period other than the mobile terminal's allocated timeslots, said first timeslot being a receive slot allocated for some other mobile terminal;
   measuring the signal strength of the received signal;
   computing a transmit power setting for the mobile terminal based on said measurement of said received signal strength to provide open loop power control; and
   transmitting a signal at said computed transmit power setting in a second timeslot in said frame period, said second timeslot being allocated for the mobile terminal.

2. A closed-loop power control method for controlling the transmit power level of a mobile terminal, said method comprising:
   receiving a transmitted signal from said mobile terminal;
   measuring the signal strength of the received signal;
   calculating a power deviation value based on the difference between the measured signal of said received signal and a predetermined reference power;
   computing a power adjustment to the current transmit power setting for said mobile terminal based on said power deviation value and a predetermined delay factor; wherein said adjustment is a fractional portion of said power deviation value; and
   transmitting the adjusted transmit power setting to said mobile terminal.

3. The closed-loop power control method according to claim 2 wherein said transmit power setting is computed by dividing the power deviation value by said delay factor and adding the result to a previous transmit power setting.

4. The closed-loop power control method according to claim 2 further comprising comparing said power deviation value to a predetermined power differential threshold and if said power deviation value exceeds said power differential threshold, determining a new transmit power setting for said mobile terminal.

5. The closed-loop power control method according to claim 2 wherein the signal strength of the received signal is measured over a plurality of frames and wherein the average value of the received signal strength over said plurality of frames is used to calculate the power deviation value.

6. The closed-loop power control method according to claim 5 wherein the average of the received signal strength is computed over a period of traffic information reception bounded by periods of signaling information transmission.

7. The closed loop power control method of claim 2 wherein the power setting for the mobile terminal is a power control constant and wherein the transmit power level for the mobile terminal is determined by subtracting the received signal strength from said power control constant.

8. The closed-loop power control method according to claim 2 further comprising receiving a transmitted signal at said mobile terminal, measuring the signal strength of the received signal, calculating at said mobile terminal an adjusted transmit power setting based on said measured receive signal strength and said transmit power setting received from said base station, and transmitting a signal from said mobile terminal at said adjusted transmit power setting.

9. The closed-loop power control method according to claim 8 wherein the signal received at said mobile terminal is transmitted by said base station in an allocated received timeslot for said mobile terminal.

10. The closed-loop power control method according to claim 8 wherein the signal received at said mobile terminal is transmitted by said base station in a timeslot other than the mobile terminal's own allocated receive timeslot.

11. An open-loop power control method for controlling the transmit power level of a mobile terminal, said method comprising:
   receiving signals transmitted to said mobile terminal in an allocated receive timeslot of a repetitive frame period for said mobile terminal;
   when no signal is received in the mobile terminal's allocated receive timeslot, switching to an alternate timeslot and receiving signals in said alternate timeslot;
   measuring the signal strength of the signals received in the mobile terminal's allocated timeslot and in the alternate timeslot;
   adjusting the transmit power level of said mobile terminal based on the measured signal strength of the signal received in the mobile terminal's own allocated receive timeslot when a signal is received therein; and
   adjusting the transmit power level of said mobile terminal based on the measured signal strength of the signal received in the alternate timeslot when no signal is received in the mobile terminal's own allocated receive timeslot.

12. The open-loop power control method of claim 11 further comprising receiving a first signal in said alternate timeslot, receiving a second signal in said alternate timeslot, determining the change in signal strength between said first and second receive signals in said alternate timeslot, and adjusting the transmit power level of said mobile terminal based on the change in signal strength between said first and second signals.

13. The open-loop power control method of claim 12 wherein said first signal is compared to a signal of known reference power to obtain a correction value based on the difference in the signal strength of the two signals, and applying the correction value to said first and second signals prior to determining the change in signal strength between the first and second signals.

14. The open-loop power control method of claim 13 wherein the signal of known reference power is transmitted on the slow associated control channel.

15. An open loop power control method for controlling the transmit power of a mobile terminal using timeslots in a repetitive frame period, said method comprising:

receiving, from a remote station operating in a discontinuous transmission mode, a periodic reference signal over a control channel at a pre-determined power level known to the mobile terminal; and varying the transmit power level of the mobile terminal over an uplink traffic channel inversely in accordance with variations in an observed strength of said periodic reference signal to provide open loop power control.

16. The method according to claim 15 wherein said control channel is the Slow Associated Control Channel.

17. A mobile terminal comprising:

a receiver to receive a periodic reference signal over a control channel from a remote station operating in a discontinuous transmission mode, said periodic reference signal transmitted at a pre-determined power level known to the mobile terminal; and a control unit to vary the transmit power level of the mobile terminal over an uplink traffic channel inversely in accordance with variations in an observed strength of said periodic reference signal to provide open loop power control.

18. The mobile terminal of claim 17 further comprising a received signal processor.

19. The mobile terminal of claim 18 wherein said received signal processor comprises a power measurement circuit to measure the strength of said periodic reference signal.

20. The mobile terminal of claim 18 wherein said received signal processor comprises a bit error detection circuit to determine a receive quality of said periodic reference signal.

21. A mobile terminal comprising:

a processor programmed to control the transmit power of said mobile terminal over an uplink traffic channel responsive to variations in an observed strength of a periodic reference signal, said periodic reference signal received by the mobile terminal over a control channel at a pre determined power level from a remote station operating in a discontinuous transmission mode.

22. The mobile terminal of claim 21 wherein said processor is further programmed to process said periodic reference signal, received signal strength, and signal quality measurements to determine a transmit power level for the mobile terminal.

* * * * *